United States Patent
Mosing

(10) Patent No.: US 7,703,554 B2
(45) Date of Patent: Apr. 27, 2010

(54) SLIP GROOVE GRIPPING DIE

(75) Inventor: Donald E. Mosing, Lafayette, LA (US)

(73) Assignee: Frank's Casing Crew and Rental Tools, Inc., Lafayette, LA (US)

( * ) Notice: Subject to any disclaimer, the term of this patent is extended or adjusted under 35 U.S.C. 154(b) by 1316 days.

(21) Appl. No.: 10/027,502

(22) Filed: Nov. 27, 2001

(65) Prior Publication Data

US 2003/0099506 A1    May 29, 2003

(51) Int. Cl.
  *E21B 19/10*    (2006.01)
(52) U.S. Cl. .................... 175/423; 285/104; 285/123.7; 285/123.9
(58) Field of Classification Search .............. 285/123.9, 285/104, 123.5, 123.6, 123.7, 123.8; 166/75.14; 175/423; 188/67
See application file for complete search history.

(56) References Cited

U.S. PATENT DOCUMENTS

| | | | | |
|---|---|---|---|---|
| 784,400 A | * | 3/1905 | Howe | 285/123.7 |
| 1,559,932 A | * | 11/1925 | Bogen | 175/423 |
| 1,849,216 A | * | 3/1932 | Adair | 175/423 |
| 2,010,938 A | * | 8/1935 | Abegg | 175/423 |
| 2,012,337 A | * | 8/1935 | Burns et al. | 175/423 |
| 3,454,289 A | * | 7/1969 | Fowler | 188/67 X |
| 4,678,209 A | * | 7/1987 | Guice | 175/423 X |
| 4,823,919 A | * | 4/1989 | Hayatdavoudi | 188/67 |
| 5,301,750 A | * | 4/1994 | Watkins | |
| 5,971,086 A | * | 10/1999 | Bee et al. | 175/423 |
| 6,264,395 B1 | * | 7/2001 | Allamon et al. | 285/123.5 |
| 6,378,399 B1 | * | 4/2002 | Bangert | 81/57.15 |

* cited by examiner

Primary Examiner—Michael P Ferguson
(74) Attorney, Agent, or Firm—The Matthews Firm

(57) ABSTRACT

A toothed pipe gripping die insert has textured surfaces on the die surface opposite the pipe gripping teeth to reduce the insert-to-insert carrier contact surface area to increase unit loading such that selected loads forcing the die insert against its carrier impresses the textured pattern into the carrier surface to reduce the tendency for the die insert to slide on the die carrier surface.

14 Claims, 2 Drawing Sheets

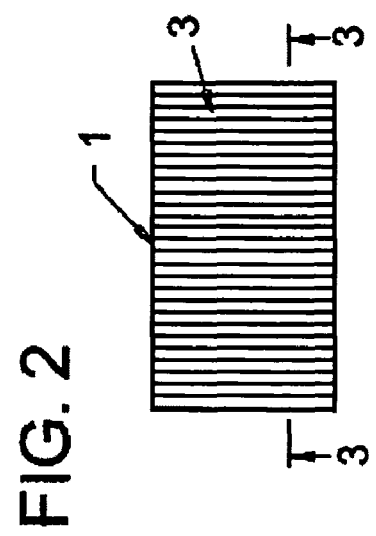
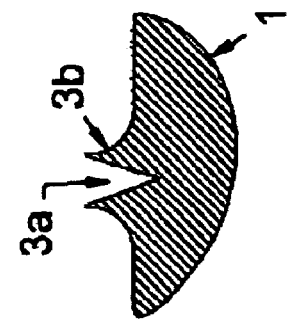
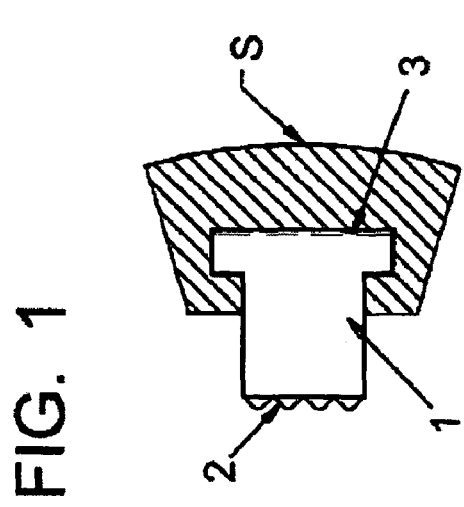
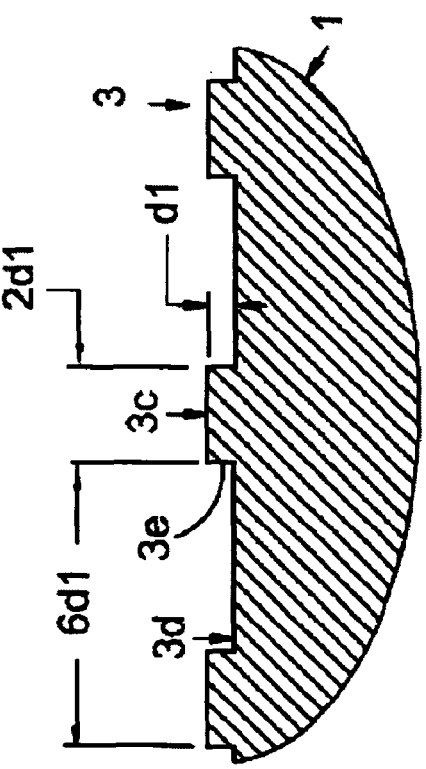

SLIP GROOVE GRIPPING DIE

This invention pertains to dies for gripping surfaces for load support. The usual application is to support pipe strings by gripping the outside surface. The dies usually fit into slips for elevators or spiders common to well drilling and servicing activities. The novel die insert has a textured surface on the thrust loaded back side which contacts the supporting groove surface of the slip. The textured surface reduces the tendency of the die insert to slide vertically in the die insert confining groove of the slip.

BACKGROUND

When supporting pipe strings in well bores, the vertical load is usually carried by surface gripping arrangements situated on elevators or spiders of drilling or servicing rigs. When circumstance requires that surfaces be gripped and forces be applied that tend to slip the gripping means along the surface, the gripping means needs teeth or the equivalent. Pipe gripping dies, especially, are the result of needing hard materials used with high unit loads to impress toothed profiles into pipe surfaces to keep dies, in pipe string handling apparatus, from slipping on pipe. Most pipe string lifting apparatus have die carrying slips that apply light loads against the pipe surface until vertical pipe loads are experienced, then the dies engage the pipe with forces that are proportional to the load being lifted. The teeth milled into the gripping face of the die are usually forced to some small amount into the surface being gripped. The teeth are subject to damage. Providing the needed teeth on a removable insert that can be easily installed in and removed from the slips reduces the expendable cost. Slips are inherent in elevators and spiders as the wedge shaped elements that convert vertical loads to radial loads on pipe gripping dies. In addition to wedge shaped slips there are several forms of equivalent means to apply radial forces for gripping pipe. The term slip will be used herein to embrace such equivalent features.

Pipe gripping die inserts are usually dove tailed, or T shaped and, during installation, are pushed along the dove tailed, or T shaped, grooves in the slip to be fitted. The grooves usually hold four or more die inserts in stacked, serial, fashion. The usual elevator or spider may have three or more stacks of die inserts distributed about the periphery of the pipe accepting bore of the pipe supporting system. When pipe loads are lifted, the upper die inserts add their supported load to the inserts below. Accumulation of vertical forces along the grooves tend to press the lowest die insert into the surface used to axially restrain each stack of die inserts in the related groove.

Surfaces are rarely perfect, and dies are rarely situated in perfect cylindrical geometry when prepared to grip pipe. Some dies carry more than their proportion of the load. When lifting pipe strings within the load rating of the elevator, some die inserts experience loads that may be a multiple of their statistically proportional load. Such die inserts may crush through the axial restraints of the confining groove. In addition to slip damage, the die inserts could fall into the well being worked, and pipe strings themselves can be dropped.

When specific die inserts experience serious overload, the size data stamped on their back, or smooth side, are often clearly impressed into the mating groove in the slip. The dies are much harder than the slips. Such image transfers are not smeared, indicating that the die inserts did not slip axially in their groove after axial loads were experienced.

The die insert slippage problem is not new. U.S. Pat. No. 6,264,395 issued Jul. 24, 2001 addresses the problem by providing intermediate barrier rings so that a fewer number of die inserts are stacked serially between barriers to reduce the ultimate force on each axial barrier. The needed result is achieved, at substantially increased construction cost. The present invention distinguishes in that there is no reduction in the number of die inserts stacked in each series. Instead, the radially loaded surface on the die insert, contacting the slip, is given more reluctance to slide.

During manufacture and maintenance procedures, die inserts are skidded along their related slip groove during installation and the grooves are designed and built with the ease of that operation in mind. When overloaded die inserts print their stamped numbers in the related groove there is no indication that they lose any ability to move axially along their related slip groove when die inserts are being changed out for servicing. The die inserts are not ground after stamping and the stamping action upsets a small amount of metal, which is subsequently hardened. The upset metal represents a very small surface area until it is driven into the surface of the mating groove. Acceptance of the impression into the groove material redistributes the total load and unit loading is reduced, avoiding damage beyond acceptable marring.

It is possible and desirable to alter the usually smooth surfaces on die inserts, that contact slip groove surfaces, to increase the acceptable load carrying power of elevators and spiders. Otherwise stated, it is desirable to reduce the overload damage to details of elevators and spiders, when operated within their overall load rating.

These and other objects, advantages, and features of this invention will be apparent to those skilled in the art from a consideration of this specification, including the attached claims and appended drawings.

SUMMARY OF INVENTION

Die inserts for use in slips of elevators and spiders have surface modifications on the side opposite the pipe engaging toothed side. The surface modifications, in the simplest form, are a pattern of stamped dots or scribed lines. In a more uniform and exacting form of texturing some surface is removed, or lowered, below the original slip contacting surface of the insert. The original surface not lowered experiences a greater unit load on the surface of the confining slip.

Some definitions are in order. Patterns can be put on metal surfaces by removing or displacing material. Stamping symbols on a surface drives a small amount of metal of the stamp into the workpiece surface. That displaces workpiece metal which rises above the original surface in the immediate vicinity of the stamped symbol.

Scribing, defined for use herein, is the process of drawing a tool across a metal surface and plowing up, or displacing, workpiece metal which rises along the side of the groove being plowed. That is metal displacement much the same as stamping. Etching is a process of removing metal to lower an original surface. Etching can be done by acid or other processes such as sand blasting. Removing metal by machining can be defined as metal removal by the use of machinery. That includes grinding. High velocity liquid jet blasting will be considered etching.

Increasing specific loading, or force per unit of area, can be dome by displacing metal upward from an original surface, or alternatively, leaving some original surface and depressing surrounding surface. The metal displaced upward is less orderly and causes highest unit loading with the least amount of texturing. The first metal displaced upward will be imbedded into facing surface with rated loads on the served asset.

Removing metal to increase unit loads on the remaining surface has little effect until a substantial amount of surface has been depressed. Machining the textured surfaces on die inserts, however, can be done on a single pass of a shaped milling cutter, or broach. This invention embraces at least the two, surface altering, general principles cited above.

Surface level changes having more transverse component in direction can be expected to provide more slip resistance of the treated die insert. That slip resistance transfers axial forces from the die insert to the slip when the die insert is loaded by pipe gripping forces.

Cracking problems are not uncommon in die insert use. As a result there is some reluctance to producing a variety of sharp edges on grooves and the like on the insert surfaces. It has been found that the groove profiles do not have to be sharp or have groove corners. When the insert surface is depressed into the slip surface, it does not appear to depend upon edge sharpness for skid resistance.

Optimum texture features may be more effective than necessary. If optimum features are more costly than suitable alternatives in such cases, compromises are good choices. One such choice is to simply scribe a myriad of transverse lines across the back of the die insert before hardening. Scribing a line produces upset metal on each side of the line. The upset metal is not very orderly on a microscopic scale but it represents a load surface of small total area above the general plane of the back of the die insert. With a fraction of the load capacity of the pipe lifting apparatus, the metal raised by scribing, then hardening, will be imbedded in the facing surface. Such economical treatment is anticipated by and is within the scope of the claims.

The optimum textured pattern is not easy to produce and inspect. Made coarser, the pattern, if still suitable for the intended use, is more economical and is recommended. In tests, the coarser patterns have added enough skid resistance to the treated die inserts to allow the groove end barrier in use to hold overloaded die inserts without damage. All surface configurations and patterns, made for increasing skid resistance of die inserts in grooves, are herein defined as textured surfaces. In field tests, holes one-half inch in diameter have been drilled to a shallow depth in the formerly smooth surface and greatly increased the reluctance of the insert to slide, when force loaded, along the retaining groove. Such forms of texture are anticipated by and are within the scope of the claims.

Presently popular die insert designs have back faces, opposite the pipe gripping teeth face, that are smooth and are carried in slip grooves that have smooth surfaces that engage the die inserts. The smooth surfaces are most economical to make and maintain.

Adding the textured surface to smooth backed die inserts usually makes it unnecessary to go to machined interlocking features that are costly.

BRIEF DESCRIPTION OF DRAWINGS

FIG. 1 is a sectional representation of the novel insert in a typical spider slip.

FIG. 2 is an elevation of the slip gripping face of the novel die insert.

FIG. 3 is a section, rather enlarged taken along line 3-3.

FIG. 4 is a sectional view of an alternate form of texture replacing the form shown in FIG. 3.

DETAILED DESCRIPTION OF DRAWINGS

Figure 5:
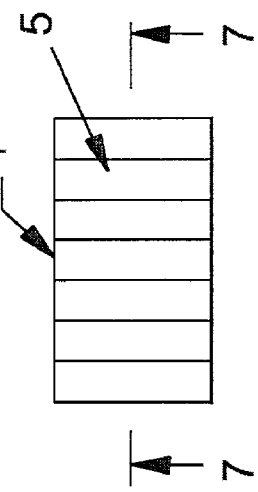
FIG. 5 is an end view of a typical dove tailed die insert.

In FIG. 1, a generalized end, or axial, view of a typical pipe handling apparatus slip and the related die insert is shown. When pipe gripping loads are imposed on face 2, the die insert is urged to slide along the slip groove, into the plane of the drawing (also down the well bore). The slips are wedge shaped and the force that urges the die insert into the plane of the drawing also forces surface 3 to the right, against the opposing surface of the slip groove. The slip is softer than the die insert and raised surfaces on the die insert are impressed into the slip surface by radial forces. The textured surface on the die insert, face 3, reduces the tendency for the die insert to skid down the groove surface.

FIG. 2 shows the slip gripping face 3 of the die insert 1. The textured profile can be much like the face of a phonograph record or can be coarse and made by such tools as key way cutters. The manufacturers logo can be etched into the die insert face to provide a textured equivalent and achieve some skid resistance. Leftward can be assumed to be downward.

FIG. 3 shows a profile machinable by simple processes. The face 3, by prior art has been smooth. In this example, one-third of the original face is left. A given force on the original surface 3 would produce a specific force, or stress, of force divided by area. After surface treatment, the surfaces 3c, collectively, loaded by the same normal force, would cause the specific force, or stress, three times the original.

In the FIG. 3 example, it can be assumed that there is a minimum dimension d1 that will be effective as a deterrent to slippage. If the depth d1 is great and the surface 3c is driven deep into the supporting slip surface, the supporting surface will be destroyed in terms of its ability to receive replacement die inserts, without great care in precision fitting, and function in a normal way. If the surface 3c is forced into the abutting surface enough to significantly grip the abutting surface and the die insert is loaded such as to skid it leftward, the force on the face 3e will tend to shear the elevated (projecting) surface 3c along the plane of surface 3d. Width 2d1 then becomes important to prevent surface spalling due to shear. For metals in common use, width 2d1 is considered minimum. This indicates that there is a limit to the fineness of texture that can be used for the purpose of the invention. Such dimension relationships are developmental reasoning, in which pursuit to extremes can be revealing, and cannot be considered a limiting matter relative to the invention or disclosure.

FIG. 4 shows a profile produced in an alternate form of treatment of surface 3. Groove 3a is a scribe line. Metal 3b is raised from surface 3 and extends along both sides of the groove. A single punch impression would leave the same sectional profile.

It is noteworthy that the smallest amount of upwardly displaced metal 3b would produce extremely high unit loads. The small projection 3b, however, would be promptly driven into the abutting metal surface until all projecting metal became imbedded. That alone, in small quantities, would be of little use because the abutting surface could slide with little resistance and projection 3b would plow a groove along the abutting surface.

If the treatment shown in FIG. 4 is extensive, sliding of the insert along the slip groove, under load, will not occur if the lifting machine is operating within rated load limits. That is assuming the existence of the usual radial to axial force relationships common to pipe string handling systems.

FIG. 5 is an end view of a dove tailed die insert. The relationship to the slip is much like that of FIG. 1. Face 2 is the coarse pipe gripping toothed arrangement and surface 5 is equivalent to surface 3. Surfaces 3 and 5 can accept all texturing profiles presented herein.

Figure 6:
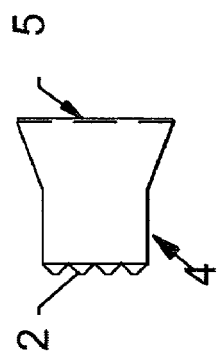
FIG. 6 is an elevation of the textured face of face 5 of the insert of FIG. 5.

FIG. 6 shows the theoretically most effective direction of texture patterns. Downward is leftward and the direction of loading tending to slide the insert along the slip groove.

Figure 8:
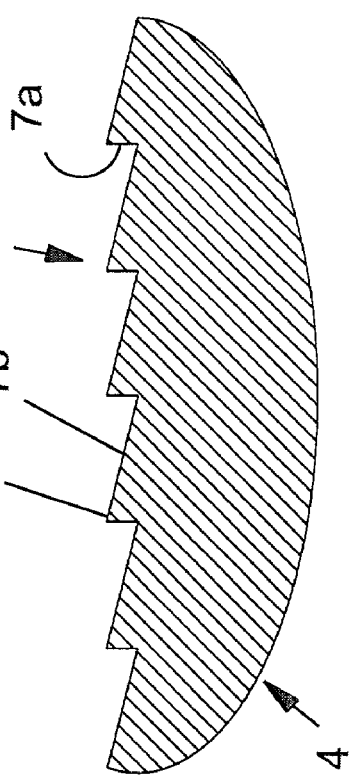
FIG. 8 is an alternate texture profile form that can be substituted for the form shown in FIG. 7.
Figure 7:
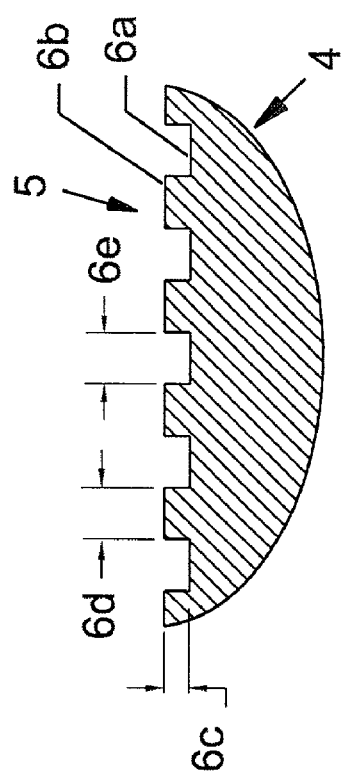
FIG. 7 is a fractured sectional view, substantially enlarged, showing the profile of typical machine cut textured surface

FIGS. 7 and 8 show profiles experimentally machined into the surface 5 of the die inserts now in use. Grooves 6a and lands 6b have been used as coarse as one-half inch axial dimension of groove and land, with suitable results. The depth 6c used was a matter of machining convenience and the depth had no controlling influence. The pattern of lands 6d were left in the mating surface of the slips but the visible pattern could hardly be felt by fingers. The coarse pattern is certainly not capable of optimizing the effect achievable by other textured inserts but it does have the effect sought in a useful amount suitable for many applications.

FIG. 8 shows machined surfaces of the preferred shape, if machined. In this saw toothed pattern, points 7c will readily embed in the abutting surface to the extent necessary to decrease the unit loading to the yield resistance of the slip. If the tooth edge 7c imbeds down to the 7b leader the unit loading will be about twice that found when smooth surfaces of inserts are thrust radially against the slip groove surface. The face 7a will produce shear stress in the teeth but the shear area progressively increases in concurrence with the imbedding of the teeth. This surface texture can be readily machined but it may be suitable formed by single pass broach work, or single pass milling with a special cutter; both of which are very economical procedures.

From the foregoing, it will be seen that this invention is one well adapted to attain all of the ends and objects hereinabove set forth, together with other advantages which are obvious and which are inherent to the die insert.

It will be understood that certain features and sub-combinations are of utility and may be employed without reference to other features and sub-combinations. This is contemplated by and is within the scope of the claims.

As many possible embodiments may be made of the die insert of this invention without departing from the scope thereof, it is to be understood that all matter herein set forth or shown in the accompanying drawings is to be interpreted as illustrative and not in a limiting sense.

I claim:

1. A pipe string handling apparatus for drilling or servicing rigs comprising:
    a plurality of pipe handling slips comprising:
    a slip body with a longitudinally extending groove having an upper groove opening, a front groove opening, and a back groove surface; and
    a die insert insertable into the longitudinally extending groove of one of the plurality of slips through the upper groove opening, the die insert comprising:
    a leg portion having a front face with a plurality of pipe gripping teeth for gripping a pipe string received by the apparatus, and
    a head portion having a back face generally parallel to the front face;
    wherein the head portion is received within the longitudinally extending groove and the leg portion extends through the front groove opening;
    wherein the back face comprises a plurality of raised lands engaging the back groove surface, and wherein the raised lands longitudinally extend along the back face generally transverse to the longitudinal length of the die insert; and
    wherein the slip comprises a material such that the raised lands are impressed into the back groove surface to transfer loading from the die insert to the slip to reduce the tendency of the die insert to longitudinally slide along the back groove surface.

2. The apparatus of claim 1, wherein said raised lands have a cross-section having a sawtooth-shape.

3. The apparatus of claim 1, wherein said raised lands are raised more than one one-thousandth of an inch from said back face of said die insert.

4. The apparatus of claim 1, wherein said raised lands are formed by a scribing process.

5. The apparatus of claim 1, wherein said raised lands are formed by an acid etching process.

6. The apparatus of claim 1, wherein said raised lands are formed by a machining process.

7. The apparatus of claim 1, wherein said raised lands form a uniform textured relief pattern on said back face of said die insert.

8. A method for gripping a pipe, comprising:
    inserting a die insert within a slip comprising a longitudinally extending groove having an upper groove opening, a front groove opening, and a back groove surface, wherein the die insert comprises:
    a head portion insertable through the upper groove opening, the head portion having a back face with a plurality of raised lands thereon extending along the back face generally transverse to the longitudinal length of the die insert; and
    a leg portion extending through the front grove opening, the leg portion comprising a front face generally parallel to the back face and having a front surface with a plurality of pipe gripping teeth adapted for gripping the pipe; and
    engaging the front surface with the pipe, wherein engagement between the front surface and the pipe presses the back face of the die insert into the slip, and wherein the plurality of lands are impressed into the back groove surface to thereby transfer loading from the die insert to the slip to reduce the tendency of the die insert to longitudinally slide along the surface of the slip.

9. The method of claim 8, wherein said raised lands have a cross-section having a sawtooth-shape.

10. The method of claim 8, wherein said raised lands are raised more than one one-thousandth of an inch from said back face of said die insert.

11. The method of claim 8, wherein said raised lands are formed by a scribing process.

12. The method of claim 8, wherein said raised lands are formed by an acid etching process.

13. The method of claim 8, wherein said raised lands are formed by a machining process.

14. The method of claim 8, wherein said raised lands form a uniform textured relief pattern on said back face of said die insert.

* * * * *